Feb. 25, 1930.    H. A. SELAH    1,748,498
CONDUIT FITTING
Filed June 11, 1926

Howard A. Selah
INVENTOR.

BY
ATTORNEYS.

Patented Feb. 25, 1930

1,748,498

UNITED STATES PATENT OFFICE

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed June 11, 1926. Serial No. 115,207.

This invention is designed to improve fittings such as are used for conduits, particularly in respect to making such fittings available for various sizes of conduits. Features and details of the invention will appear from the specification and claims.

The invention is illustrated in the accompanying drawings as follows:—

Figure 1:
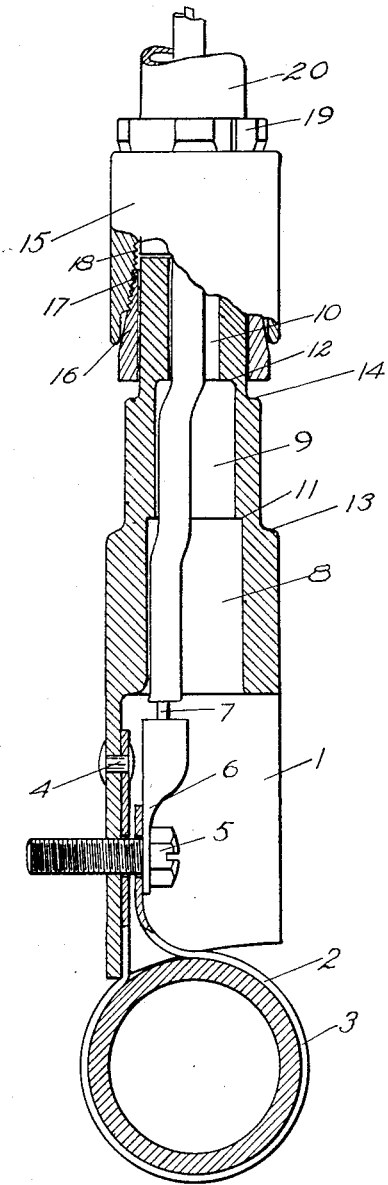
Figure 2:
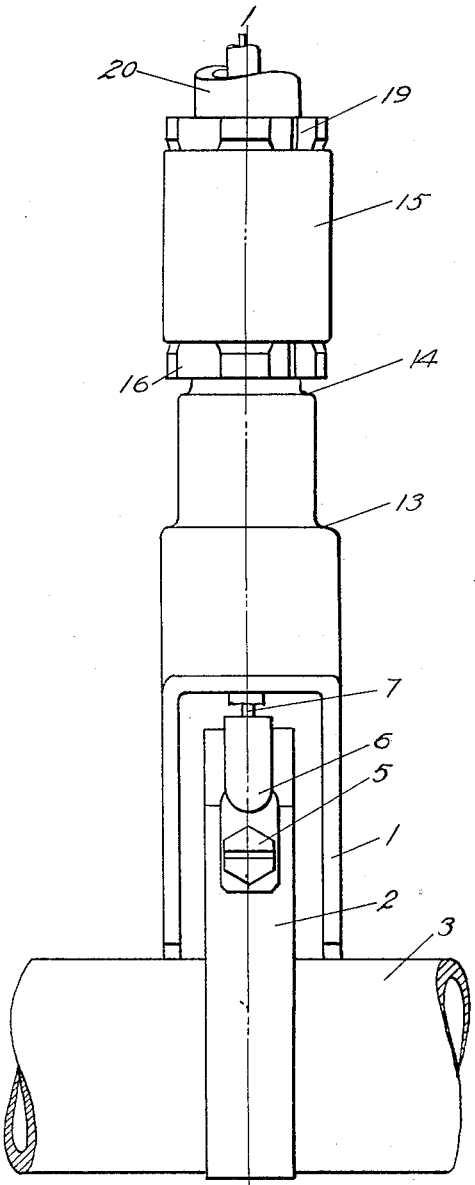

Fig. 1 shows a section on the line 1—1 in Fig. 2.

Fig. 2 a front elevation of the structure.

1 marks the fitting, and 2 a clamping strap extending around a supporting pipe or conduit 3. The strap is secured to the fitting by means of a rivet 4 and a screw 5 extends through a conductor terminal 6 and the end of the strap 2 thus securing the terminal and clamping the strap, on the pipe, or conduit 3, thus securing the fitting. The terminal 6 is connected to a conductor 7, which conductor extends through a stepped opening in the fitting. The fitting as shown has three steps with interior steps 8, 9 and 10, the steps 8 and 9 terminating in shoulders 11 and 12 which are in advance of ends 13 and 14 of the wall having a diameter in relation to the openings 8 and 9. The result is that between the shoulders 11 and 13 and 12 and 14 a comparatively thin wall is formed which can be severed if it is desired to use the larger size.

As shown the smaller step of the extension is used as a coupling securing a conduit thereto. The coupling has a body 15 in the end of which is arranged a tapered sleeve 16 having threads 17 engaging threads 18 in the body. By screwing up the tapered sleeve 16 it may be contracted into engagement with the outer wall of the smallest step. A similar sleeve 19 is screwed into the outer end of the body and engages a conduit 20 through which the conductor is led. If a larger conduit is used, the extension is severed between the shoulders 12 and 14 and a coupling of a size to extend over the wall of the opening 9 used. Similarly if the largest opening is desired the extension is severed between the walls 11 and 13 and a coupling of this size used.

What I claim as new is:—

1. A conduit fitting having a stepped extension with both the interior and exterior surfaces stepped from larger to smaller diameters in the same direction, the walls of the fitting being thinner at the juncture of each step than the walls of the steps whereby the wall at the juncture is weakened.

2. A conduit fitting having a stepped extension with both the interior and exterior surfaces stepped from larger to smaller diameters in the same directions, the interior diameter of a larger step being extended into the wall of the next smaller step and forming thereby a thin zone of severance between the steps.

In testimony whereof I have hereunto set my hand.

HOWARD A. SELAH.